INVENTOR.
JOHN KOLLAR 3,743,672
SEPARATION OF WATER IN ALKYLENE GLYCOL MONO AND DIESTER PURIFICATION BY AZEOTROPIC DISTILLATION
John Kollar, Wyckoff, N.J., assignor to Halcon International, Inc.
Filed May 27, 1970, Ser. No. 40,990
Int. Cl. B01d 3/36; C07c 67/06
U.S. Cl. 260—497 A    11 Claims

ABSTRACT OF THE DISCLOSURE

This invention relates to a process for separating water from a reaction mass obtained by the catalytic oxidation of olefins to the corresponding alkylene glycol di and mono esters. More specifically, the invention teaches a method of separating water from the halogen containing components of the oxidation catalyst.

BACKGROUND OF THE INVENTION

It has been recently discovered that alkylene glycol carboxylic esters can be selectively produced by the oxidation of olefins in carboxylic acid in the presence of catalysts, including halogens. In these processes the halogens are used in conjunction with metal catalysts, such as the palladium-copper-lithium system shown in British Pat. 1,027,396 or the variable valent metals hereinafter discussed.

While the aforesaid process provides an effective and efficient method of producing alkylene glycol esters, commercial realization of this process requires that the halogen compounds be substantially recovered. Particularly, difficulty has been experienced in recovering the portion of these halogen compounds which distill over during the separation of the water formed in the reaction. Separation of these compounds from the water requires costly separation operations.

DETAILED DESCRIPTION

In accordance with this invention, it has been found that the loss of the halogen compounds during the distillation of water from the reaction product can be sharply minimized, if not completely eliminated, by performing the distillation in the presence of a select group of azeotroping agents. By following the teaching of the invention the separation of water with substantially complete halogen recovery may be carried out in simple distillation apparatus.

Figure 1:
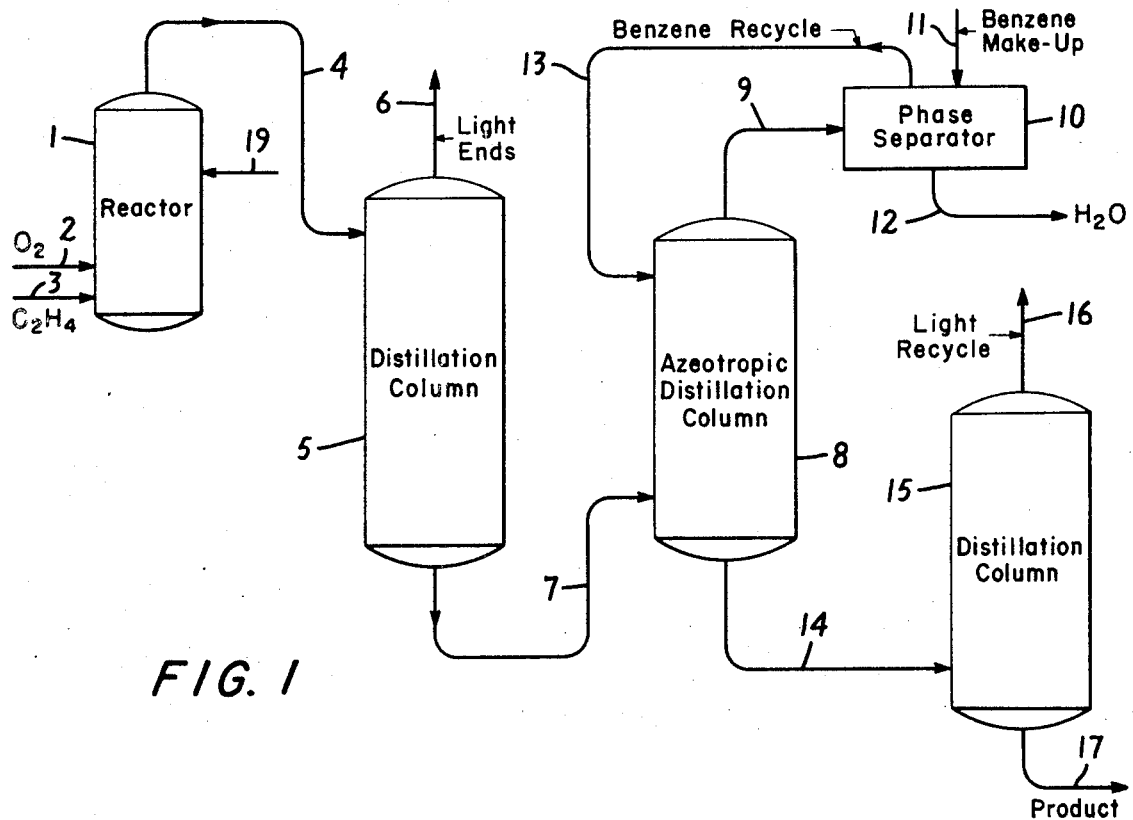
FIG. 1 illustrates a practice of the invention for purifying the product obtained by oxidation in the presence of a variable valent metal and a bromine compound.

The olefins suitably employed in this invention are alkenes, ar-alkenes, and cycloalkenes. Included among the alkenes are mono-alkenes, di-alkenes, and tri-alkenes. The double bond in the mono-alkenes may be positioned at any one of the carbon atoms such as the alpha, beta, gamma and delta positions. Preferably the alkenes are straight or branch chain containing from 2 to 30 carbon atoms. Among the di-alkenes the double bond may be conjugated or isolated and the carbon chain may be straight or branched wherein the double bonds are located in any desired position. The ar-alkenes contain an aromatic nucleus with an alkenyl side chain as described above. The cycloalkenes contain from 5, to 15 carbon atoms in the nucleus and at least one double bond.

More specifically, the alkenes may be: lower monoalkenes of from 2 to 5 carbons, intermediate alkenes of from 6 to 12 carbons or higher alkenes of from 13 to 30 carbons. Among the lower alkenes are ethylene, propene, allyl alcohol, butene-1, butene-2, 2 - methyl-butene - 2, pentene-1 and the like. Among the intermediate alkenes are heptene-2, octene-1 and decene-1 and among the higher alkenes, tetradecene-1, pentadecene-1, hexadecene-1, pentacosene-1 and triacontene-1. The lower di-alkenes may suitably contain up to 8 carbons, the intermediate alkenes 9 to 14 carbons, and the higher alkenes 15 to 20 carbon atoms. Examples of these di-lower alkenes are 1,3 - butadiene, 1,5 - hexadiene, 1,4 - pentadiene and 1,3-hexadiene.

More specifically, the ar-alkenes may be ar-lower alkenes such as: phenyl alkenes and di-phenylalkenes wherein the alkenyl side chain may be any of those described above. Examples of such compounds are phenyl lower alkenes wherein the alkene side chain contains from 2 to 5 carbons, such as: styrene, 2-methyl styrene and alpha-ethyl-beta-methyl styrene and diphenyl alkenes such as: 1,1-di-phenylethylene, 1,2-diphenyl propene and 2,3-diphenylbut-2-ene. The cycloalkenes may have from 5 to 12 carbon atoms, e.g., cyclopentene, cyclopentadiene, cyclohexene, cyclodecene, cyclododecene and cyclododecatriene.

All of the above alkenes, ar-alkenes and cycloalkenes may contain one or more functional substituents which are inert to the reaction, such as, nitro, cyano, chloro, lower alkoxy (methoxy, propoxy), lower alkylitho (methylthio, butylthio), hydroxy, and lower alkanoyloxy of 2 to 6 carbons (acetyloxy).

In the more preferred aspects of this invention, the mono and di-lower alkenes, mono intermediate alkenes, mono higher alkenes, ar-lower alkenes and cycloalkenes are employed; and in its most preferred aspect ethylene, propylene, allyl alcohol, 1,3-butadiene, allyl acetate, allyl chloride, butene-2, methylbutene-2, decene-1, styrene and cyclohexene; but especially ethylene, propylene and butene-2 are employed.

Included among the acids suitably used in the oxidation are aliphatic acids, alicyclic mono carboxylic acids, heterocyclic acids and aromatic acids, both substituted and unsubstituted. For example, the invention contemplates the use of lower mono aliphatic acids of 1 to 4 carbon atoms such as, formic, acetic, propionic, butyric and isobutyric; intermediate mono aliphatic acids (of from 5 to 10 carbons) such as: valeric, isovaleric, caproic, enanthic, caprylic, pelargonic capric; higher mono aliphatic acids (of from 11 to 30 carbons) such as: lauric myristic, palmitic, stearic, hexacosanoic and tricosanoic; di-aliphatic acids of from 2 to 6 carbons, such as, oxalic, malonic, succinic, glutaric and adipic. The invention further contemplates the use of substituted mono aliphatic acids containing one or more functional substituents such as lower alkoxy (methoxy, propoxy), chloro, cyano, lower alkylthio (methylthio, ehylthio, butylthio) and the like, examples of which may be cited as acetoacetic, chloropropionic, cyanoacetic, methoxyacetic acid and 2-methylthiopropionic acid. Among the aromatic acids contemplated may be mentioned acids containing one or more carboxyl groups such as: benzoic, 1-naphthoic, 2-naphthoic, o-toluic, m-toluic, o-chlorobenzoic, m-chlorobenzoic, p-chlorobenzoic, o-nitrobenzoic, p-toluic, m-nitrobenzoic, p-hydroxybenzoic, anthranilic, m-aminobenzoic, p-aminobenzoic, phenylacetic, 2,4 - dichlorophenoxyacetic, hydrocinnamic, 2-phenylbutyric, 1-naphthalene-acetic and phthalic. The alicyclic mono carobxylic acids may contain from 3 to 6 carbons in the ring, both substituted and unsubstituted, and containing one or more carboxyl groups such as: cyclopropanecarboxylic, cyclopentanecarboxylic and hexahydrobenzoic. The heterocyclic acids may contain from 1 to 3 fused rings both substituted and unsubstituted, contain one or more carboxyl groups and containing at least one and less than 4 hetero atoms such as oxygen, sulphur or nitrogen, examples of which may be cited as: picolinic, nicotinic, 3-indoleacetic, furoic, 2-thiophenacarboxylic, quinolinic, 2-methylindole-3-acetic, 3-chloro furoic, and 4-nitronicotinic.

In the more preferred aspects of this invention, the carboxylic acid is an aliphatic acid or aromatic acid, but especially the monophenyl aromatic acids and the lower aliphatic acid such as the lower unsubstituted mono aliphatic acids or benzoic acid and more especially acetic acid.

The invention further contemplates the use of mixed carboxylic acids in any desired ratio, although it is preferred to employ the same acid as solvent and acid moiety by the subsequently desired ester. It is also within the contemplation of this invention that the final ester product may be used as the solvent. The carboxylic acid employed may suitably be any commercially available acid, such as aqueous acids. It is preferred, however, to employ commercial acids having no more than 25% water, and especially less than 5% water, such as 98% acetic acid. The acids used may suitably contain the various organic and inorganic impurities normally associated with the various commercial acids and for the purpose of this invention may remain as impurities or be removed as one desires.

The variable valent metal cations which may be used in conjunction with the halogen source include Te, Ce, Sb, Mn, V, Ga, As, Co, Cu, Se, Cr and Ag. These metals may be added as single salts or mixtures as, for example, of the metal itself, the carbonate, the oxide, the hydroxide, the bromide, the chloride, the lower alkoxide, phenoxide or carboxylate.

The halogen source may be hydrobromic or hydrochloric acid; however, bromine or chlorine per se or the alkali, alkaline earth or heavy metal salts may be added. Organic bromides and chlorides can also be employed.

The concentration of the halogen employed in the catalyst combination, expressed as contained halogen in weight percent of total solution, may be from .01% to 30% or higher, but preferably 0.1% to 20%. The concentration of the variable valent metal expressed in terms of equivalents of metal to equivalents of bromine or chlorine may suitably vary from 1:0.01 to 1:100, but preferably 1:0.2 to 1:40 and especially 1:1 to 1:20. The catalyst combination is described in detail in co-pending application U.S. Ser. No. 847,409 filed Aug. 4, 1969.

The ratio of oxygen to oelfin used in the oxidation is not critical and, therefore, any suitable ratio may be used. The source of oxygen may be oxygen gas or a mixture of oxygen and an inert gas such as found in air.

The carboxylic acid used as the acid moiety is used in excess of the theoretical amount needed for reaction. When an inert solvent is employed, the amount of acetic acid for practical reasons, should be at least equivalent to that required to prepare the final product. The solvents used are preferably the carboxylic acids, particularly acetic acid, however, other inert solvents may be readily employed such as benzene, t-butyl benzene, t-butanol or the alkylene glycol esters themselves.

The reaction temperature may vary from 80° C. to the boiling point of the system under the reaction pressure. Preferably, the temperature is between 100° and 200° C., particularly, between 120° and 180° C.

The time of reaction depends upon the concentration of the reactants and, therefore, may be readily determined by those skilled in the art.

For additional details of the preferred oxidation reaction reference is made to copending U.S. patent application 819,507, filed Mar. 24, 1969.

In accordance with the present invention, the alkylene glycol ester oxidation reaction mixture is treated for the recovery of various products and for the separation and recycle of other components. It is the essence of the present invention that the water of reaction contained in the reactor effluent mixture be separated from halogen containing components by means of the specified azeotropic distillation with the herein specified azeotroping agents whereby water substantially free of halogen is separated overhead in azeotropic mixture with the azeotroping agent from a bottom stream containing the halogen compounds produced during the reaction.

In a practice of the invention, which practice is not specifically illustrated in the attached drawings, the oxidation reactor effluent is subjected to initial distillations whereupon the low boiling components of the mixture including water, carboxylic acid, and a portion of the total content of halogen containing compounds are flashed overhead and separated from the heavier components comprising alkylene glycol mono and di-esters as well as carboxylic acid, heavier bromine containing organic compounds and catalyst residues. In this embodiment of the invention, the low boiling components are then subjected to distillation with the azeotroping agent whereby water is separated overhead from the halogen containing compounds, said halogen containing compounds being conveniently recycled together with such carboxylic acid as they are associated with to the oxidation reaction.

Alternative procedures are, of course, possible. In various embodiments described in the attached figures, the reactor effluent is not initially distilled in order to separate water and low boiling halogen compounds from the bulk of the ester reaction products before azeotropic dehydration but rather the effluent is subjected to the azeotropic distillation whereby water substantially free of halogen is separated as overhead product and subsequently the bottoms from this azeotropic dehydration is further treated in order to resolve this bottoms into various component constituents.

Thus, in accordance with the invention, water is successfully separated by the described azeotropic distillation procedures from a solution which also contains various halogen compounds which are formed in the oxidation reaction. It is not essential to practice of the invention that the mixture which is subjected to the azeotropic dehydration contain product alkylene glycol mono or di esters.

Those compounds useful for removal of water from the halogen containing recycle are, broadly, those compounds forming azeotropes with water which have atmospheric boiling points less than about 90° C. and especially those compounds which are insoluble in water. Specifically, these include: hydrocarbons, paraffinic or olefinic, having from 5 to 8 carbon atoms, such as, pentane, hexane, heptane, octane, pentene, hexene, cyclohexene, cyclohexane, cyclopentane, methyl cyclohexane, cyclohexadiene and disobutylene; aromatics, such as benzene, xylene, toluene, ethylbenzene, cumene and styrene; nitriles having 2 to 4 carbon atoms, such as, acrylonitrile and methacrylonitrile; alcohols having 3 or 4 carbon atoms, and cyclohexanol; esters of acetic, acrylic and formic acid with methyl, ethyl, propyl and allyl alcohols; ethers having 5 to 8 carbon atoms; ketones having 4 to 7 carbon atoms such as cyclohexanone; and nitromethane, methyl nitrate and trimethylamine.

The amount of azeotroping agent added is at least that required to form the known atmospheric azeotrope with water. The optimum amount for a particular system can be readily determined by those skilled in the art. As more azeotroping agent is used, the number of trays in the distillation column is reduced, but the heat requirements for each pound of water removed increases. From the economic standpoint it is generally uneconomical to use more than five times the minimum required to form the atmospheric azeotrope. In practice, this means that from about one-tenth to about 10 times the volume of the azeotroping agent should be employed for each volume of water to be removed.

Any conventional apparatus may be used to perform the separation, such as continuous tray or packed columns. The operating pressure is not critical.

In order to illustrate more fully the instant invention attention is directed to the following example:

Example 1

Referring to FIG. 1, to reactor 1, oxygen and ethylene in a mol ratio of 9 moles of ethylene per mol of oxygen are fed at a rate of 185 liters (standard conditions) per hour via lines 2 and 3, respectively. The reactor initially contains 455 grams of anhydrous acetic acid, 5 grams of tellurium dioxide and 40 grams of HBr (added as an azeotropic mixture of HBr and water). The reactor temperature is maintained at 170° C. and the pressure 120 p.s.i.g. In the continuous process make-up acetic acid is added via line 19. After steady state operation has been attained, the vapors from the reactor 1 contain, by mol, about 0.25 part ethylene glycol diacetate and precursors, 5.55 parts acetic acid, 0.25 part water and the remainder primarily ethylene (7.3 parts) with some unreacted oxygen (0.62 part) and bromine compounds (0.07 part per hour contained Br) and are fed via line 4 to distillation column 5, in which the light end components, that is, those components having a boiling point lower than water, are removed overhead via line 6. This overhead also contains unconverted gases from which the light components are separated by partial condensation (not shown). The bottoms fraction from the distillation column 5 is passed via line 7 to azeotropic distillation column 8. A water-benzene mixture is removed overhead via line 9 and fed to a phase separator 10 wherein the water is decanted and removed via line 12 from the benzene. The benzene is recycled via line 13 back to the azeotropic distillation column 8. Make-up benzene is supplied via line 11. Analysis of the water removed via line 12 indicates that it contains $30 \times 10^{-6}$ mol/hour bromine compounds. This distillation is performed at a head temperature of about 65° C. at atmospheric pressure. The bottom fraction from the azeotropic distillation column 8 passes via line 14 to the distillation column 15 wherein recycleable materials are removed overhead via line 16, from ethylene glycol diacetate product which is removed, via line 17.

Example 2

Into a one liter titanium lined autoclave is charged 450 grams of acetic acid, 10.5 grams of tellurium dioxide, 39 grams of a 48% solution of hydrobromic acid and 38.6 grams of 2-bromoethyl acetate. The system is closed and pressurized to 400 p.s.i.g. with nitrogen. Oxygen, at a rate of 25 liters per hour, and ethylene, at a rate of 250 liters per hour are sparged into the liquid with agitation and the temperature of the system is brought to 160° C. The reaction is conducted for 80 minutes after which time the autoclave is cooled and pressure released.

The reaction product is distilled in a 20 plate Oldershaw distillation column. The following distillation cuts are taken:

| | Boiling point | Weight, grams |
|---|---|---|
| Cut number: | | |
| 1 | 87–90 C. at 1 atm | 2.1 |
| 2 | 97–101 C. at 1 atm | 49.8 |
| 3 | 101–117 C. at 1 atm | 256.9 |
| 4 | 60–124 C. at 90 mm | 157.1 |
| 5 | 124–126 C. at 90 mm | 103.2 |
| 6 | Residue | 23.6 |

Cuts 1, 3, 4 and 6 are combined for recycle to the oxidizer. The product cut (cut 5) is found to be substantially pure and completely free of bromine. The water cut (cut 2) however, is found to contain 4.4% of the total bromine charged. Of the total water cut only 23.2 g. of water need be removed since this represents the net water make. The balance representing most of the water charged with the 48% HBr is recycled.

Example 3

Cut 2 above is combined with 100 g. of benzene and subjected to azeotropic distillation. The water taken overhead weighs 37.2 g. and is free (limit of detection) of bromine.

Example 4

Make-up acetic acid is added to the benzene and bromine bottoms from Example 3 and the benzene is distilled overhead and found to be free of bromine. The bottoms from this distillation can be recycled to the autoclave.

These examples comprise a batchwise simulation of a continuous process in which a water-acetic acid cut is first recovered from heavier materials and then dehydrated by azeotropic distillation. Such operation is more fully described by Example 5.

Example 5

Figure 2:
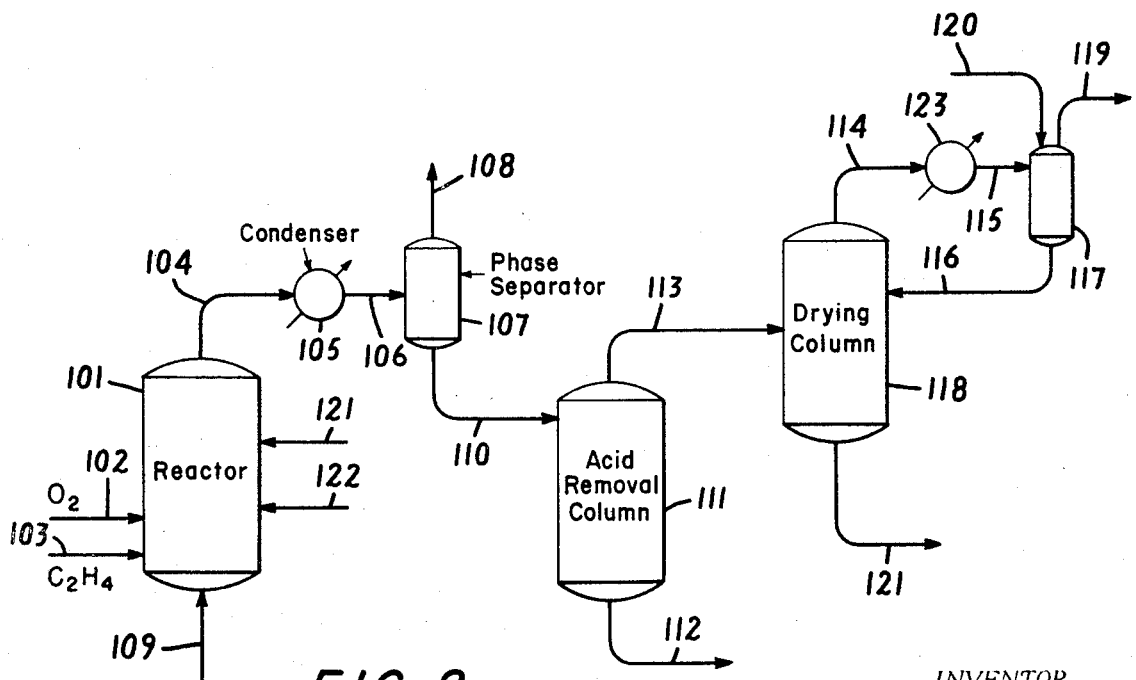
FIG. 2 shows a second embodiment wherein a chlorine compound is employed in the oxidation.

With reference of FIG. 2, to reactor 101 a one-gallon glass lined autoclave, air and ethylene in a molar ratio of about 1:1 are fed at a rate of 3960 liters/hour via lines 102 and 103, respectively. The reactor initially contains 2700 grams of anhydrous acetic acid, 60 grams of manganese diacetate tetrahydrate, 90 grams of anhydrous HCl and 150 grams of water. Reactor temperature is maintained at 160° C. and pressure is 120 p.s.i.a.

When steady state is achieved, the liquid contains about 17 mol percent water and 1.4 mol percent ethylene glycol mono and di acetates. These latter are being produced at a steady rate of 0.18 mol/hour-liter.

Vapors from reactor 101 are fed via line 104 to a partial condenser 105 wherein heavier components are liquified. This gas liquid mixture is fed via line 106 to phase separator drum 107 from which a gas stream 108, substantially free of non-volatile components, is removed. Ethylene and oxygen values in this stream may be recovered for re-use. Line 110 feeds liquid from the phase separator 107 to acid removal column 111. A mixture of acid, water, and catalytic components is removed overhead in this column and separated from the bottoms product of mixed di and mono acetates. This latter product is removed by line 112.

The overhead product from the acid removal column 111 is fed via line 113 continuously to a 20 tray Oldershaw column 118 operating at atmospheric pressure where hexane is employed as azeotroping agent. The external reflux ratio of the column 118 (L/D) is about 3.5 and the head temperature is about 63° C. The column 118 pot temperature is about 115° C. Vapors from column 118 are withdrawn overhead through line 114 and are condensed in condenser 123. The condensate passes via line 115 into a phase separator 117 from which the hexane phase is returned through line 116 to column 118 as reflux and the aqueous phase is withdrawn through line 119. Net bottoms product from this column is recycled via line 121. Less than 0.1% hexane remains in the bottoms. This hexane is made up via line 120. Similarly, HCl contained in the aqueous phase removed through line 119 is made up via line 122.

The composition of the several streams shown in FIG. 2 is as follows:

MATERIAL BALANCE
[Moles]

| Stream number | 102 | 103 | 104 | 108 | 110 | 113 | 112 | 119 | 121 | 122 |
|---|---|---|---|---|---|---|---|---|---|---|
| Component; | | | | | | | | | | |
| Mono and diglycols | | | 101 | Nil | 10 | 1 | 100 | | 1 | |
| Acetic acid | | | 22,400 | 2.0 | 22,398 | 22,398 | 0.1 | Nil | 22,398 | |
| Water | | | 18,200 | 2.0 | 18,198 | 18,198 | Nil | 100 | 18,098 | |
| Total chlorides (as HCl) | | | 825 | Nil | 825 | 825 | Nil | 5 | 820 | 5 |
| $O_2$ | 3,170 | | 3,120 | 3,120 | | | | | | |
| $N_2$ | 12,680 | | 12,680 | 12,680 | | | | | | |
| $C_2H_4$ | | 15,501 | 15,400 | 15,400 | | | | | | |

What is claimed is:

1. In a process for the preparation of alkylene glycol esters wherein an olefin having from 2 to 30 carbon atoms is reacted in a reaction zone with molecular oxygen in a lower carboxylic acid in the presence of a catalyst, including a halogen source, the improvement of: separating the water of reaction from unconverted carboxylic acid and from halogen compounds contained in a mixture derived from said reaction and recovered from said reaction zone, said separating being effected by the steps which comprise distilling said mixture in a distillation zone and adding an azeotroping agent to said zone whereby the distillation is carried out in the presence of said azeotroping agent which forms an azeotrope with water and selectively removes the water from said carboxylic acid and from said halogen compounds present in said mixture.

2. The process of claim 1 wherein the azeotroping agent is benzene.

3. The process of claim 1 wherein the olefin is ethylene, the carboxylic acid is acetic acid and there is produced a mixture of ethylene glycol mono and di-acetates.

4. The process of claim 1 wherein the olefin is propylene, the carboxylic acid is acetic acid and there is produced a mixture of propylene glycol mono and di-acetates.

5. The process of claim 1 wherein the halogen source contains bromine.

6. The process of claim 1 wherein the halogen source contains chlorine.

7. The process of claim 1 wherein the azeotroping agent is toluene.

8. The process of claim 1 wherein the azeotroping agent is xylene.

9. The process of claim 1 wherein the azeotroping agent is a lower paraffin.

10. The process of claim 9 wherein the lower paraffin is hexane.

11. The process of claim 1 wherein the azeotropic distillation is run in the presence of alkylene glycol ester products.

References Cited
UNITED STATES PATENTS

| | | | |
|---|---|---|---|
| 1,722,532 | 7/1929 | Maude | 203—16 |
| 2,144,654 | 1/1939 | Guthmann et al. | 203—15 |
| 3,084,109 | 4/1963 | Ure et al. | 460—541 |
| 3,223,734 | 12/1965 | Fallstad et al. | 203—DIG. 6 |
| 3,262,969 | 7/1966 | Clark et al. | 260—497 A |
| 3,349,118 | 10/1967 | Kohll et al. | 260—497 A |
| 3,350,420 | 10/1967 | Fariss | 203—16 |
| 3,530,043 | 9/1970 | Horn et al. | 260—541 |

WILBUR L. BASCOMB, JR., Primary Examiner

U.S. Cl. X.R.

203—14, 15, 69, 70, DIG. 6